US006966422B2

(12) United States Patent
Lanfranchi

(10) Patent No.: US 6,966,422 B2
(45) Date of Patent: Nov. 22, 2005

(54) ADJUSTABLE APPARATUS FOR ORIENTING CONTAINERS

(75) Inventor: Mario Lanfranchi, Collecchio (IT)

(73) Assignee: Lanfranchi S.r.l., Parma (IT)

( * ) Notice: Subject to any disclaimer, the term of this patent is extended or adjusted under 35 U.S.C. 154(b) by 262 days.

(21) Appl. No.: 10/415,880

(22) PCT Filed: Aug. 16, 2002

(86) PCT No.: PCT/EP02/09190

§ 371 (c)(1),
(2), (4) Date: May 1, 2003

(87) PCT Pub. No.: WO03/024847

PCT Pub. Date: Mar. 27, 2003

(65) Prior Publication Data

US 2004/0026301 A1 Feb. 12, 2004

(30) Foreign Application Priority Data

Sep. 6, 2001 (IT) .......................... PR2001A0057

(51) Int. Cl.[7] ............................................. B65G 47/24
(52) U.S. Cl. .................. 198/396; 198/397.01; 198/443
(58) Field of Search ........................... 198/396, 397.01, 198/397.02, 443, 444

(56) References Cited

U.S. PATENT DOCUMENTS 3,887,062 A * 6/1975 Bushman .................... 198/443
3,948,386 A * 4/1976 Nalbach ..................... 198/396
4,825,995 A * 5/1989 Nalbach ..................... 198/396
5,400,893 A * 3/1995 Spatafora .................... 198/396
5,996,768 A * 12/1999 Boyce et al. .......... 198/397.01
6,098,781 A * 8/2000 Lanfranchi .................. 198/400
6,302,258 B1 * 10/2001 Verona ....................... 198/392

FOREIGN PATENT DOCUMENTS

EP 995701 A2 * 4/2000
EP 997406 A2 * 5/2000
FR 2682093 * 4/1993

* cited by examiner

*Primary Examiner*—James R. Bidwell
(74) *Attorney, Agent, or Firm*—Shlesinger & Fitzsimmons; Philip K. Fitzsimmons; David E. Henn

(57) ABSTRACT

The invention relates to the field of machines for directing and aligning plastic containers and particularly relates to an universal device for automatically adjusting vertically directing and aligning means in dependence on said containers size. The orienting means are formed by a plurality of cradles (5) and the aligning means are formed by a corresponding plurality of discharge channels (6), both means are provided with movable parts (10) and (35) respectively adjustable in dependence on plastic containers size. The device provides at least one control member (7) located on the machine outer stationary cylindrical wall (3) and adapted to engage movable parts (10) and (35) of cradles and discharge channels respectively while the inner hopper holding bulk plastic containers rotates.

10 Claims, 5 Drawing Sheets

Figure 1:
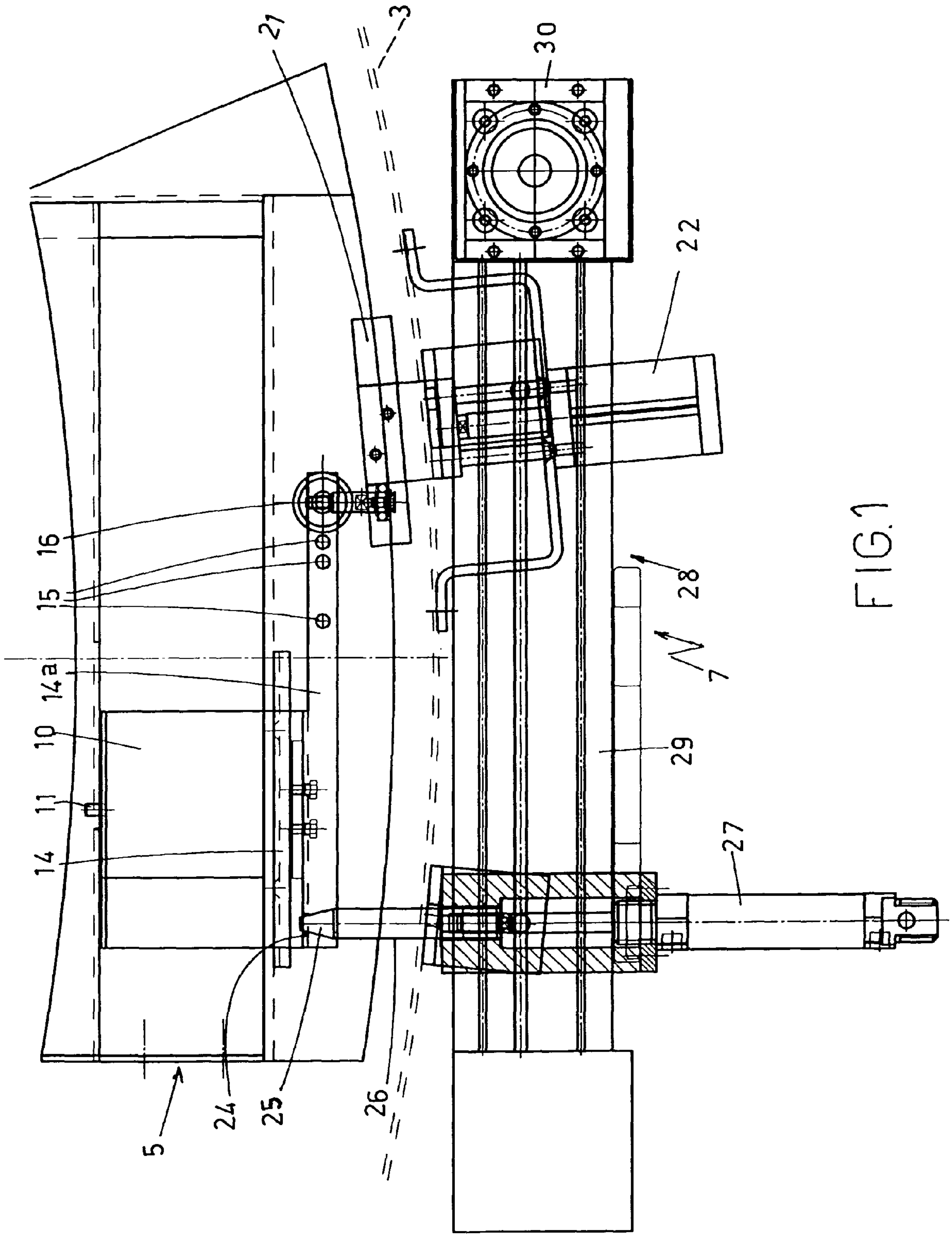

14a
14
16
12
11
38
37

39
35
49
40
45
44
36
33
34
6
50
4

ADJUSTABLE APPARATUS FOR ORIENTING CONTAINERS

The subject matter of the present invention is an universal device for automatically adjusting means for directing and aligning plastic containers in a directing-aligning machine for feeding a packaging or bottling line.

Directing-aligning machines of the present specification comprise a cylindrical receptacle or hopper holding flung about plastic containers.

The hopper inside is provided with means for horizontally carrying containers or bottles on the hopper upper edge to be discharged in a plurality of bottom-opened cradles or trays provided with bars for holding their necks and other bars for holding their bottoms, their longitudinal dimension being substantially equal to the bottles height.

There are number of said means for horizontally moving bottles on the hopper upper edge: the most common means comprise a stationary helical guide arranged adjacent to the hopper, and vanes integral with the hopper are provided between the helical guide and the hopper to be rotated, such as the means described in patent EP 374107.

Preferably, the hopper is provided with a conical bottom which can be stationary or rotating.

In another kind of machine, said means are formed by a plurality of elevators located between the inside wall and the conical bottom of the rotating hopper, said elevators rotating in association with the hopper, as described and shown in Italian patent n. 1.253.395.

In other kinds of machines, the hopper bottom is flat and tilted and it is rotated around its tilted axis, see patent U.S. Pat. No. 4,130,194, the hopper receives a rotating tilted disk peripherally provided with a plurality of cradles.

Every directing-aligning machines show the capability of substituting more or less rapidly the directing and/or aligning means in dependence on the container size, anyway said machines require a human operator as described in patent IT 11759699.

The capability of adjusting cradles and discharge channels size by moving some walls forming cradles and discharge channels is shown in already known machines, such those described in UK 1558379 EP 65866.

The adjustment of these machines is manual and time consuming.

Devices and systems for automatically adjusting directing machines and aligning machines are already known, such as the devices described in international patents WO 99/59904 and WO 01/40084.

The system described in patent WO 99/59904 is very complicated despite the fact is capable of automatically interchanging cradles and discharge channels of different size and it can be used only with machines without hoisting systems, such as elevators, helical guides, or thrust vanes in their hoppers.

In addition, existing machines provided with interchangeable cradles and discharge channels can not be provided with said systems.

Another disadvantage of the automatic size interchanging system of both patents WO 99/59904 and WO 01/40084 consists in the deformation of one of the cradles and channels adjusting means which causes stoppage of the automatic size interchange system because the size change is simultaneously done in the whole machine.

The object of the present invention is to overcome the abovementioned disadvantages by providing a very simple device which allows to interchange cradles and discharge channels with new cradles and discharge channels of different size in suitable time and which can be mounted in existing commercially available machines.

Another object is the possibility to accomplish the size change in presence of a damaged discharge channel such as in case of a warped jammed bottle.

The technical problem solved by the present invention consists in controlling the movable components of cradles and discharge channels by one or more control members located in one or more positions on the hopper or on its stationary cylindrical wall so that, on machine rotation, the control member will engage the movable components of said cradles and/or discharge channels.

These and other objects are achieved by a foodstuff conveying system in a universal device for adjusting means for vertically directing and aligning plastic containers in a directing-aligning machine characterized by the following claims and particularly by the fact it provides at least one control member located on the machine outer stationary cylindrical wall and adapted to engage the movable components of cradles and discharge channels during the rotation of the inner hopper holding bulk plastics containers. The machine could be rotated in a continuous or step-by-step mode.

Figure 2:
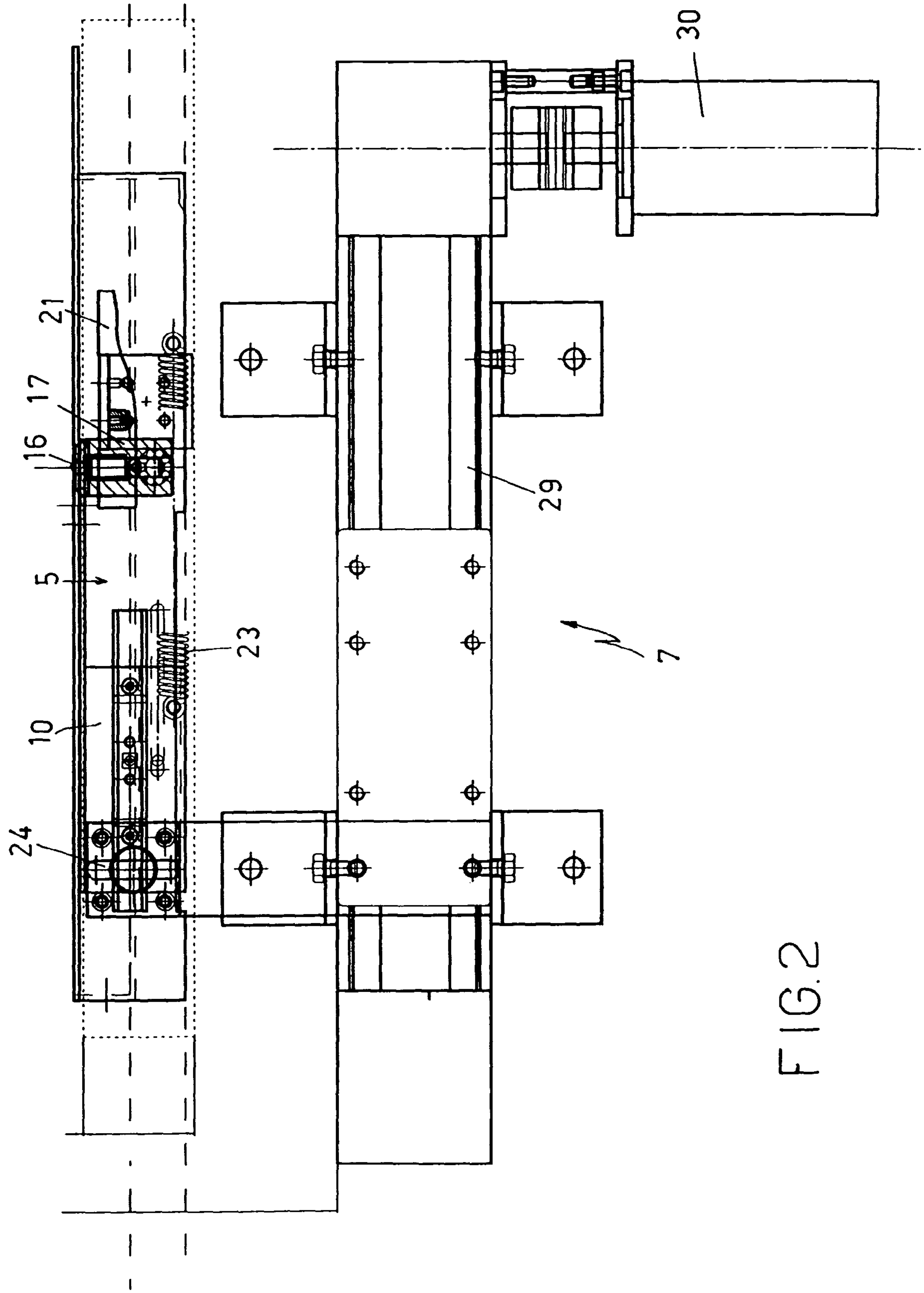
Figure 3:
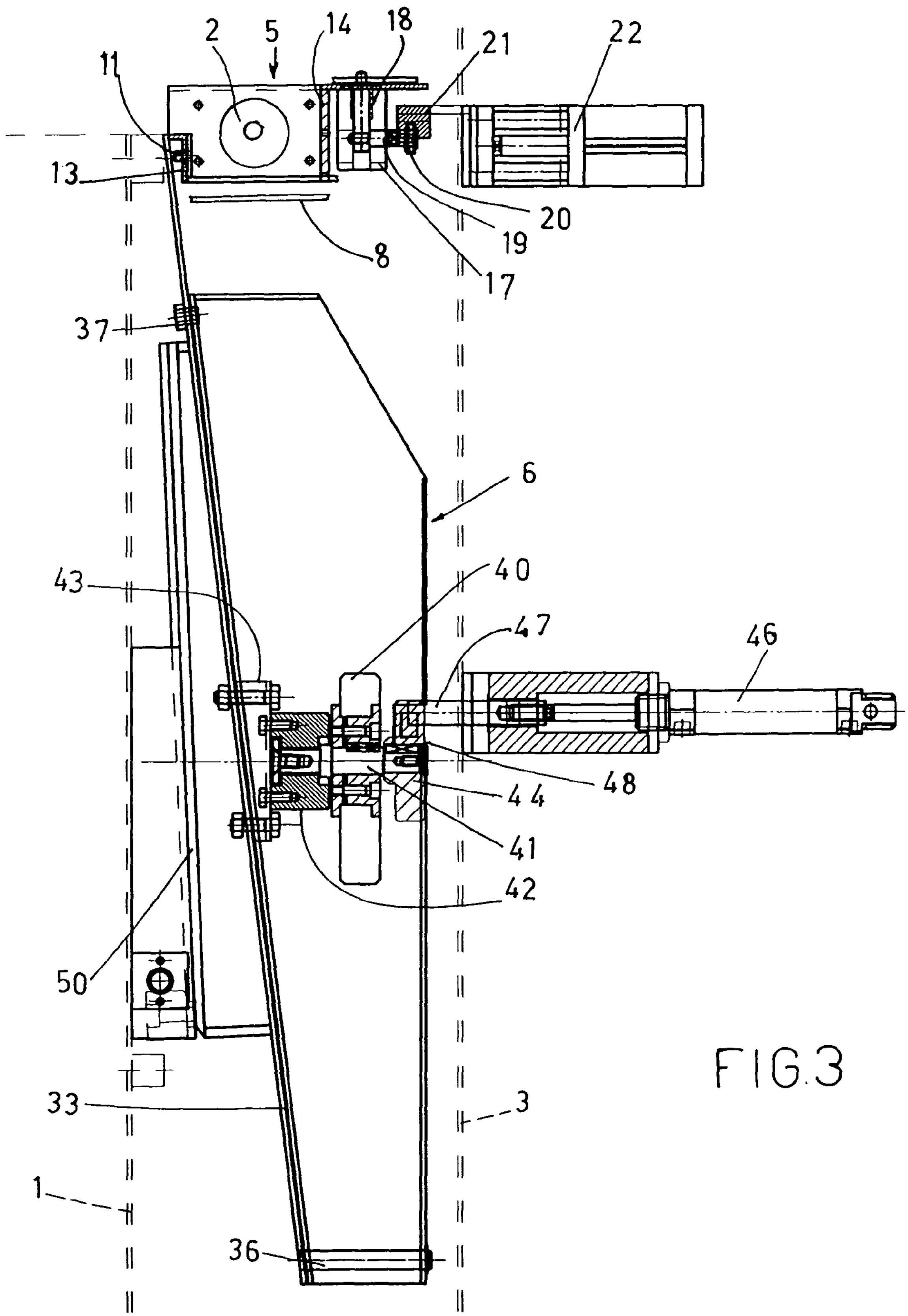
Figure 4:
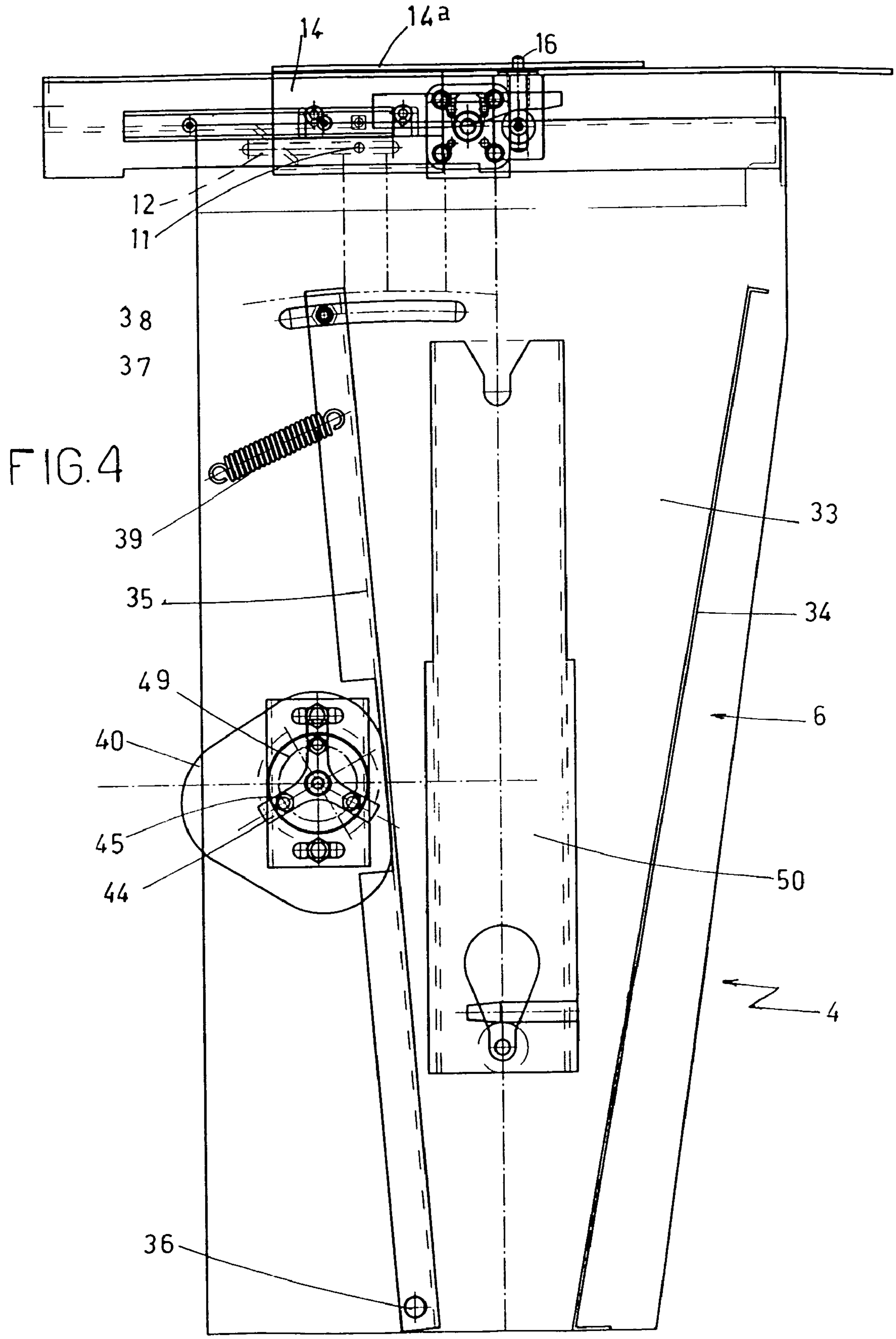
Figure 6:
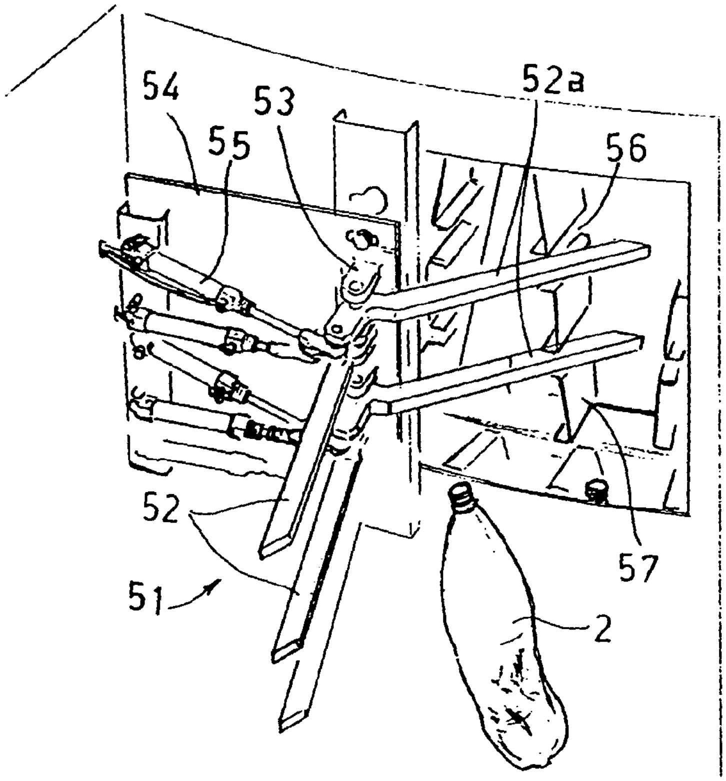
Figure 5:
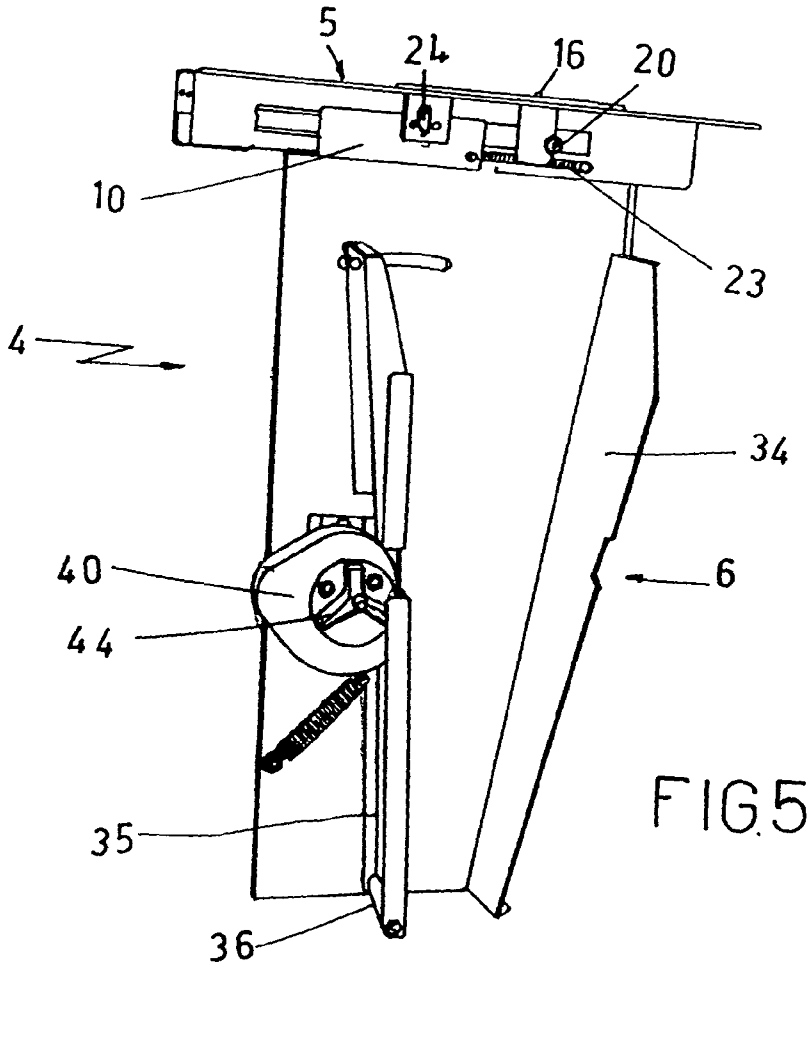

These and other features will be apparent by the following specification of a preferred embodiment shown in a non-limiting and illustrative way in the attached drawing, wherein:

FIG. 1 is a top plan view of the device,

FIG. 2 is a front view of the device from the outer side of the machine, particularly of the cradles, FIG. 3 is a side view of the device, FIG. 4 is front view of the device from the inner side of the machine, particularly of the discharge channel, FIG. 5 is perspective view of the device, particularly of the cradle and discharge channel interconnected, FIG. 6 is a perspective view of a detail of a device for ejecting crushed bottles.

Referring to figures, 1 is an inner rotating wall of a cylindrical receptacle or hopper holding bulk plastic containers 2 of a directing-aligning machine (partially shown). 3 is a outer stationary cylindrical wall concentric to the inner rotating wall, an annular chamber defined between said walls contains cradles 5 and discharge channels 6. Control members 7 of the automatic adjusting device, generally shown with 4, are located on the fixed outer cylindrical wall.

A number of cradles 5 adapted to horizontally receive plastic bottles 2 and an equal number of discharge channels 6 adapted to vertically hold and align bottles dropped in the cradles are connected to the outer side of the inner rotating wall.

Cradles and discharge channels can be divided or joined and between cradles and channels there is flat partition wall 8 terminating where a container drops from a cradle into a channel.

Referring to FIGS. 2 and 3, cradle 5 consists of four side stationary walls arranged as an opened-bottom parallelepiped receiving a moving slide 10 provided with a pin 11 slidable in a slot 12 made in a bracket 13 integral with a bottom portion which will be described hereinafter.

The means for vertically directing the bottles is formed by the moving slide 10 and the cradle.

A hole of a plurality of holes 15 defined on the horizontal side 14*a* of a bracket 14 integral with the moving slide 10 can receive a finger 16 elastically biased by a spring 18. Finger 16 is supported by a vertical cylinder 17 to which a pin 19 is fixed supporting a roller 20 adapted to engage with a shaped cam or slide 21 supported by a stem of an air piston 22 integral with the outer side of the outer stationary cylinder.

A spring 23 is fixed between the moving slide and the cradle stationary part so that said slide, once disengaged by the finger, moves to the stop on the cradle right side.

A vertical slot 24 defined on the vertical wall of the bracket 14 receives a wedge 25 supported by a stem 26 of an air cylinder 27 which in turn is supported by a handling device 28 along an horizontal axis.

Handling device 28 is provided with an horizontal slide 29 driven by a brushless motor 30.

Referring to FIGS. 3 and 4, it will be described a discharge channel which consists of a rear vertical wall 33 and two tilted walls 34 and 35 forming a downward funnel.

Wall 34 is stationary while wall 35 is pivoted to a pivot 36 so that can rotate around its pivot to change its inclination to the vertical.

Pivot 36 is fixed to the rear wall 33 and the wall rotation results in a enlargement or contraction of the mouth of the discharge channel, the discharge channel exit being unchanged.

The movable wall 35 is guided at the top by a pivot 37 slidingly received in a slot 38 made in the rear wall 33.

A spring 39 is attached to the tilted wall 35 and rear wall for continuously pushing said tilted wall against a cam 40.

In the example shown, the cam 40 has three lobes and it is keyed to a shaft 41 supported by a hub 42 integral with a bracket 43 fixed to the rear wall 33.

A star-shaped element 44 is keyed to shaft 41, in this example the element 44 has arms equally spaced apart by 120°, rollers 45 are pivoted to the ends of said arms.

A member for controlling the movable wall 35 is perpendicularly fixed to the outer surface of stationary cylindrical outer wall 3.

Said control member consists of a cylinder 46, preferably an air cylinder; when the cylinder is operative, its stem 47 passes through a hole 48 in the stationary cylindrical wall 3, intersecting the circumferential path 49 of the rotating rollers 45.

A frame 50 for connecting the discharge channel and the associated overhead cradle to the outer surface of the inner rotating wall 1 is supported by the rear wall 33 externally to the discharge channel.

Referring to FIG. 6, a device for extracting crushed bottles from discharge channels end portions adaptable to bottles size will be described.

The extracting device shown in 51, is supported by the outer stationary cylindrical wall and is provided with a plurality of pairs of rods 52 hinged to brackets 53 integral with a slab 54 integral with said outer stationary cylindrical wall.

Each rod is controlled by an air cylinder 55 to rotate from a rest position to an operative position wherein rods, such as 52*a*, enter between spaces 56 made in a lower channel 57 underneath the discharge channel 6.

In the following the operation of the device assisted by a processor will be described.

The human operator must only select by the processor the size of bottles to be introduced in bulk in the machine.

Upon this selection, the vertical directing means and aligning means will be completely and automatically adjusted while the inner rotating cylinder rotates one turn according to the following sequence.

A photocell located in the cradles path will starts the cycle which first of all comprises the operation of air cylinder 21 to drive cam-shaped slide 20 in engagement with roller 19 and then, upon machine rotation, to drive finger 16 downward exiting one of holes 15 allowing movable slide 10 to freely move on the cradle right side by spring 22 bias to a stop where pin 11 abuts the slot 12 end.

In this position, the handling system along the horizontal axis will align the wedge with vertical slot defined in the vertical wall of bracket 14 integral with the movable slide. Thereafter the operation of the air cylinder 26 will cause the wedge to enter the slot.

The handling system, by the brushless motor, will horizontally move the movable slide to a selected location where it stay by inserting finger 16 in a hole 15 corresponding to said location.

While the cylinder disengages the finger, the stem of cylinder 46 intersects the rollers path of the star-shaped element 44.

In this position, the machine rotation will cause the rotation of the star-shaped element 44 and consequently of the lobe cam moving the movable wall 35 to a new angular location.

If two angular rotation are required for each machine turn, two cylinders 46 are provided.

The cradle and discharge channel adjustment has been completed, by continuing the rotation of the machine, the following cradle and its associated discharge channel will confront the control members 7 starting another operation cycle similar to the one described. The machine adjustment depending on the plastic container size, will be made every its complete turn when the adjustment device, being in a stationary location, will have adjusted all the cradles and the discharge channels.

During the adjustment, the machine rotation could be continuous or step-by-step for each discharge channel.

From the above description it is apparent that the device could be easily used with any kind of machine with both a helical guide or elevator-type bottle selection-elevation system and a disk-type selection system having a rotation axis tilted to the vertical and it has been called universal because it can be used with every kind of machine with cradles and discharge channels moving for example along a circular or substantially circular path.

From the description it is apparent that the device can be easily used with machines provided with cradles and discharge channels without adjusting systems because the control member is located outside the machine on a stationary part of the machine; obviously cradles and channels must be substituted with the ones described, the substitution being fast and easier in that cradles and channels are integral in the illustrated example.

The devices could be more than one for a quicker adjustment, for example by two devices, the adjustment will be automatically completed after a machine rotation of 180°.

Reference has been specifically made to a vertical axis machine with a cylindrical rotating bin receiving bulk plastic containers or bottles, however the device, since it is universal, can be used with a tilted axis machine provided with two disks rotating around said tilted axis, the upper one peripherally carrying a plurality of cradles, while the discharge channels are connected between the upper and lower disk.

Control members can be always stationary and integral with an outer stationary housing surrounding the disk which is the bin receiving bulk containers.

What is claimed is:

1. Universal device for automatically adjusting plastic containers vertically directing and horizontally aligning means in a directing-aligning machine, said machine comprising: a substantially cylindrical receptacle holding bulk plastic containers, comprising a rotating cylindrical wall, to an outer portion of the cylindrical wall a plurality of cradles (5) and a corresponding plurality of discharge channels (6) are fixed both provided with movable parts (10) and (35) respectively which can change their position in dependence on the containers' size; a stationary cylindrical wall (3) surrounding cradles and discharge channels, characterized by the fact that it is provided with at least one control member (7) located on the machine outer stationary cylindrical wall (3) and adapted to engage cradle (5) movable parts (10) and discharge channel (6) movable parts (35) on receptacle rotation, the at least one control member varying the position of said movable parts of the cradles and discharge channels in dependence on containers' size.

2. Automatic adjusting universal device according to claim 1, characterized by the fact that the movable part of each cradle comprises a movable slide (10) provided with a plurality of holes (15), a finger (16) being elastically insertable in one of said holes, the finger keeping the movable slide in a predetermined location, and a vertical slot (24) receiving a control member.

3. Automatic adjusting universal device according to claim 2, characterized by the fact that the movable slide comprises a pin (11) slidable in a slot (13) defined on the cradle stationary wall, the pin and slot being a stop for the slide biased by a spring (23) connected between the movable slide and the cradle stationary wall.

4. Automatic adjusting universal device according to claim 1, characterized by the fact that the movable part of each discharge channel comprises a wall (35) pivoted to a pin (36) for varying the wall's inclination with respect to the vertical, a lobed cam (40) being spring-biased against the wall (35) for determining several stationary locations.

5. Automatic adjusting universal device according to claim 1, characterized by the fact that the control member (7) comprises, with reference to the movable slide (10): an air cylinder (22) integral with the outer surface of the stationary cylindrical wall (3), said cylinder supporting at least one of a shaped slide and a shaped cam (21) adapted to engage a roller (20) supported by finger (16) for disengaging said finger on machine rotation; an air cylinder (27), whose stem is provided with a wedge (25) adapted to enter the vertical slot (24), said air cylinder (27) being supported by a horizontal slide (29), said cylinder being movable along said slide by a motor (30).

6. Automatic adjusting universal device according to claim 1, characterized by the fact that the control member (7) comprises, with reference to the movable wall (35), an air cylinder (46) supported by the cylindrical stationary wall whose stem can engage a star-shaped element (44) keyed to the same shaft to which is keyed the lobed cam (40).

7. Automatic adjusting universal device according to claim 1, characterized by the fact that comprises a device (51) for extracting containers jammed inside the discharge channel end portion, said device being supported by the outer stationary cylindrical wall (3) and provided with a plurality of rods (52) pivoted to the stationary wall (3) and individually controlled by air cylinders (55), the rods to be inserted in spaces (56) defined in a lower channel (57) underneath discharge channel (6) being chosen in dependence on containers size.

8. Universal device for automatically adjusting plastic container vertically directing and horizontally aligning means in a directing-aligning machine, said machine comprising: a bin for holding bulk plastic containers, at least one rotating disk located outside said bin and peripherally supporting a plurality of cradles, said disk having a vertical or tilted rotation axis, a plurality of discharge channels being connected to said disk or between said disk and a lower disk, the cradles and discharge channels being provided with movable parts which can vary their position in dependence on the containers size, characterized by the fact it is provided with at least one control member located on a machine outer stationary wall forming the bin, the control member being adapted to engage the movable parts of cradles and discharge channels during the disk rotation for varying the position in dependence on the containers' size.

9. Automatic adjusting universal device according to claim 8, characterized by the fact that bin rotation is continuous or step by step.

10. The automatic adjusting universal device according to claim 7 wherein the plurality of rods are by pair controlled by the air cylinders.

* * * * *